May 3, 1927.
E. F. BLACK
1,627,309
LEAK TIGHT SECTIONAL TANK
Filed Oct. 25, 1926
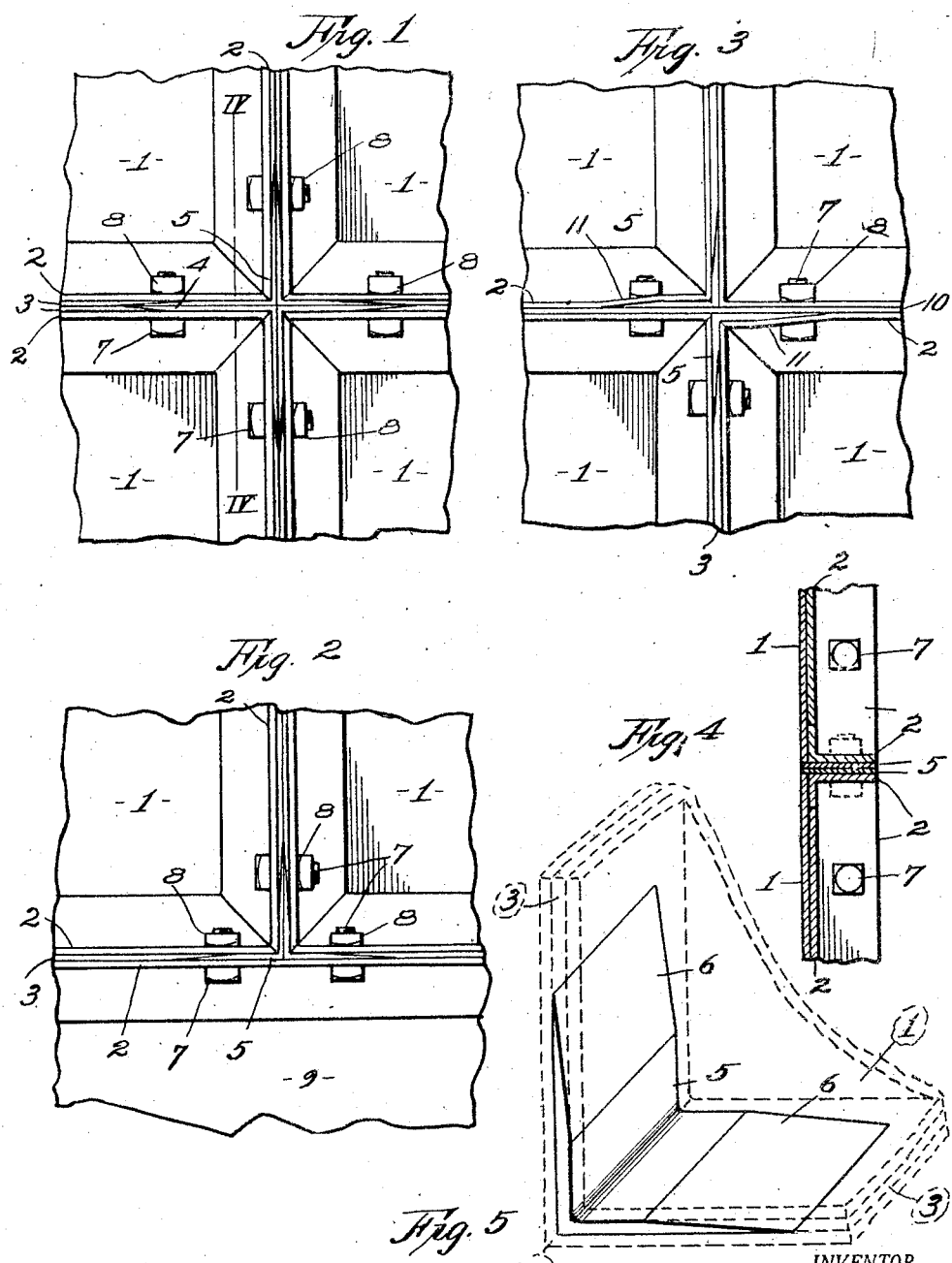

Patented May 3, 1927.

1,627,309

UNITED STATES PATENT OFFICE.

EDWARD F. BLACK, OF TULSA, OKLAHOMA, ASSIGNOR TO BLACK, SIVALLS & BRYSON MFG. CO., OF KANSAS CITY, MISSOURI, A CORPORATION OF DELAWARE.

LEAK-TIGHT SECTIONAL TANK.

Application filed October 25, 1926. Serial No. 143,930.

This invention relates to sectional tank structures of that general class composed of flanged plates bolted together and against interposed gaskets. Heretofore it has been difficult in such structures to so fit or arrange the gaskets as to avoid leaks at the corner joints particularly, and at some of the points where gaskets running in one direction abutted endwise against the ends or sides of gaskets extending in another direction. Various means and methods have been resorted to for securing leak-proof joints, but when secured it has been at an expense out of proportion to the total cost of the tank. It has therefore long been a desideratum to make leak-proof corner joints economically, and I have discovered that by the provision of angle-shaped gaskets such result can be accomplished at a relatively low cost in time and labor, and that by providing the arms of such gaskets with relatively long tapered ends, they can be used in conjunction with unbroken straight gaskets to produce leak-proof corner joints, or can be used in overlapping relation with one or more straight gaskets correspondingly tapered at the ends.

My object therefore is to provide packing elements or gaskets for use between angular flanged plates and bearing such relation to each other and to straight gaskets as to provide leak-proof joints.

With this general object in view, the invention consists in certain novel and useful features of construction and combinations of parts as hereinafter described and claimed; and in order that it may be fully understood reference is to be had to the accompanying drawing, in which:

Figure 1 is a fragmentary elevational view disclosing four flanged plates and interposed gaskets arranged in accordance with the invention, the vertical and horizontal flanges of the juxtaposed plates occupying the same respective planes, and the angle gaskets employed being arranged in the form of a cross.

Figure 2 is a view showing three plates, the bottom one bridging the vertical joint between the upper ones, said figure also showing only two of the angle gaskets and a single gasket between the horizontal flanges of the upper plates and the horizontal flange of the lower plate.

Figure 3 is an elevational view showing four angle plates and also shows a single but continuous gasket between the upper and lower plates, and one pair of angle gaskets, one engaging the upper end and the other the lower side of the continuous straight gasket, this construction representing a more economical use of packing material than the construction disclosed by Figure 1.

Figure 4 is a vertical section on the line IV—IV of Figure 1.

Figure 5 is a detail perspective view of one of the angle gaskets.

Referring now to the drawing in detail, 1 represents portions of rectangular plates employed in the erection or construction of a tank of sectional type, and said plates are provided with outwardly projecting marginal flanges 2 which may be integral with the plates or be arms of stiffening angles welded or otherwise properly secured to the plates. Where plates are arranged as shown in Figure 1, that is, where the respective vertical and horizontal flanges are alined, it is preferable to interpose two straight gaskets or packing strips 3 between adjacent flanges, and to taper the extremities of said gaskets so as to provide between them V-shaped notches 4 located relatively near the point where the corners of the plates are closely adjacent.

To pack such point and to also provide for a leak-tight connection with said gaskets 3, angle-shaped gaskets 5 are employed, said gaskets having their arms tapered at corresponding sides as at 6. In the construction shown in Figure 1, four of these angle gaskets are employed. They are arranged flatly together in the form of a cross and the juxtaposed tapered ends constitute long V-shaped points which engage the corresponding V-shaped notches 4 and hence provide long overlapping joints between the arms of the angle gaskets and the straight gaskets. By thus constructing and disposing the gaskets the symmetrical arrangement of the plates 1 and the alinement between their marginal flanges is in nowise disturbed, and when the flanges are secured together by bolts 7 and nuts 8, the plates are joined together at their corners in leak-proof relation. Furthermore the extreme corner of each plate,—which in actual practice is slightly rounded, that is not usually perfectly square and sharp as desirable,—engages the inner or reentrant corner of its respective angle gasket in such manner that no leak can occur at this point, and it may be noted that this is the point which ordinarily is the most difficult to efficiently and economically pack. By this arrangement the space between adjacent plates is uniform throughout.

In Figure 2 the construction is the same as in Figure 1 in principle. It differs from the former in that it shows a single plate 9, with its flange 2 bridging the joint between the vertical flanges of the overlying plates. In this case, only two angle gaskets are employed, and consequently it is necessary to use but a single gasket 3, the gaskets 3 between each plate 1 and the plate 9 of course having tapered ends to overlap the corresponding ends of the angle gaskets to provide a leak-proof connection therewith of uniform thickness.

In Figure 3, four plates are shown as in Figure 1, but the packing is used more economically, as only a pair of angle gaskets 5 are employed, and interposed between them is a single straight horizontal gasket 10, there being a single gasket 3 between each pair of adjacent vertical flanges of the angle gaskets. The gaskets 3 are arranged in overlapped relation as described with regard to the respective vertical arms of the two angle gaskets. The other two or horizontal arms of the angle gaskets bear at their untapered sides against opposite sides of strip 10. It is necessary therefore where a single gasket 10 is employed, that the horizontal flanges of a pair of the diagonally opposite upper and lower plates, must be sprung or distorted in order to accommodate the bevelled faces of the horizontal arms of the angle gaskets and bear a leak-tight relation thereto and to the unbevelled portions of said arms and the gasket 10, this distortion being effected by applying the fastening devices with the requisite force to so spring or distort the said flanges, which of course will be of material susceptible to such action.

There are other possibilities of use for angle gaskets of the character described, for example, as indicated by dotted lines, Figure 5, where a flanged plate 1 fits in a correspondingly contoured corner or angle 1ª, and a single angle gasket is employed to make the corner joint leak-proof, it being understood that in this arrangement there will be one bevelled gasket 3 in alinement with each arm of the angle gasket so that where the arms of the latter and the straight gaskets abut, the abutment shall be in overlapping relation and of considerable area, as distinguished from the end abutment of two packing strips having square ends, as joints formed by square non-overlapping ends are not dependably leak-proof.

From the above description, it will be apparent that I have produced a leak-proof sectional tank structure embodying the features of advantage set forth as desirable in the statement of the objects of the invention, and it is to be understood that I reserve the right to make such changes or modifications as fall within the principle and scope of the appended claims.

I claim:

1. A compressible gasket of angular form, the arms of the gasket being tapered toward their free extremities.

2. A compressible gasket comprising arms extending at right angles to each other, the arms of the gasket at the reentrant side of the angle being tapered toward their free extremities.

3. The combination of a pair of plates having angular corners and provided with marginal vertical and horizontal flanges, a straight packing interposed between opposed vertical flanges of the plates, an angle-shaped packing having one of its arms between said parallel flanges and disposed in alined and overlapping relation to the straight packing, the reentrant angle of said angle-shaped packing receiving the flanged corner of one of the plates; a plate in the vertical plane of said pair of plates, provided with a flange parallel to the horizontal flange of one of said pair of plates and to the horizontal arm of the angle packing, and a straight packing interposed between the opposed horizontal flanges of the said plates and engaging the horizontal arm of the angle packing with a liquid-tight relation.

4. The combination of a series of plates occupying the same vertical plane and provided with corners and marginal flanges, angle-shaped gaskets conforming to the corners of said plates and fitted flatly together between adjacent flanges of the plates and receiving in their reentrant angles the corners of the plates, the arms of the gaskets being bevelled toward their free ends; a pair of straight gaskets fitting flatly together between adjacent flanges of adjacent plates and having bevelled ends arranged in overlapping relation to the bevelled ends of the arms of the gaskets, respectively alined with said straight gaskets, and means for clamping the gaskets together and to the flanges of the plates engaging the interposed gaskets.

5. The combination of a pair of right angle shaped gaskets arranged with a pair of their arms in back-to-back abutting relation and their other arms in alinement, the abutting arms being tapered at opposite sides to a common point and the said other arms being tapered toward their free ends; a pair of rectangular plates having adjacent corners fitting the reentrant angles of the gaskets and having marginal flanges; a pair of straight gaskets interposed between the said flanges and bevelled to conjointly form a V-shaped notch receiving the pointed ends of the abutted arms of the angle gaskets; corresponding straight gaskets alined with the said other arms of the angle gaskets and bevelled at their ends correspondingly and forming overlapping joints with the bevelled ends of said arms; a plate underlying the first-named plates and the alined arms of said gaskets and the straight gaskets engaging said alined arms of the gaskets, and means for clamping the plates together and upon the interposed gaskets.

In witness whereof I hereunto affix my signature.

EDWARD F. BLACK.